United States Patent

Hara et al.

Patent Number: 5,319,498
Date of Patent: Jun. 7, 1994

[54] MOVING OBJECT EXTENSION CONTROLLER

[75] Inventors: Minoru Hara, Hachioji; Kazuhiro Satoh, Sagamihara, both of Japan

[73] Assignee: Olympus Optical Co., Ltd., Tokyo, Japan

[21] Appl. No.: 10,371

[22] Filed: Jan. 28, 1993

[30] Foreign Application Priority Data

Jan. 30, 1992 [JP] Japan .................................. 4-015485

[51] Int. Cl.$^5$ .............................................. G02B 7/11
[52] U.S. Cl. ................................................... 359/824
[58] Field of Search ................ 359/823, 824, 825, 826

[56] References Cited

U.S. PATENT DOCUMENTS 5,150,260  9/1992  Chigira ................................. 359/823

FOREIGN PATENT DOCUMENTS

| 0297718 | 1/1992 | Fed. Rep. of Germany ...... 359/824 |
| 60-91338 | 5/1985 | Japan . |
| 62-102212 | 5/1987 | Japan . |
| 0107224 | 4/1989 | Japan ................................. 359/823 |
| 1-158420 | 6/1989 | Japan . |
| 1-167715 | 7/1989 | Japan . |
| 1-265213 | 10/1989 | Japan . |
| 1-166427 | 6/1990 | Japan . |
| 0036511 | 2/1991 | Japan ................................. 359/825 |
| 4-177206 | 6/1992 | Japan . |

Primary Examiner—Edward K. Look
Assistant Examiner—Mark Sgantzos
Attorney, Agent, or Firm—Louis Weinstein

[57] ABSTRACT

A lens barrel drive unit for a camera, in which the present invention is implemented, comprises a lens barrel that is a moving object having a female screw, a drive screw that includes a male screw which engages with the female screw and that moves the lens barrel back and forth with the rotation of the male screw, a drive source for rotating the drive screw, a signal generator for generating a pulse signal according to the rotation of the drive source or drive screw, a first memory that stores a difference between a theoretical lead and an actual lead of the drive screw as a correction coefficient, a second memory that stores the theoretical number of pulses associated with a quantity of rotation of the drive screw which is required to drive the lens barrel to a given position corresponding to a subject distance, and a computing unit that uses the correction coefficient and the theoretical number of pulses to compute the actual number of pulses required for extending the lens barrel.

45 Claims, 12 Drawing Sheets

MOVING OBJECT EXTENSION CONTROLLER

BACKGROUND OF THE INVENTION

1. Field of the Invention

The present invention relates to a moving object extension controller.

2. Description of the Related Art

A known extension mechanism for a moving object; such as, a lens of a camera has been disclosed in Japanese Patent Laid-Open No. 1-158420. This mechanism is shown in the longitudinal cross-sectional diagram of FIG. 10, wherein a cam ring 206 is rotated to advance or withdraw first and second lens frames 201 and 202 along the optical axis O.

The above mechanism will be described in detail. First, an output of a drive motor 209 is transmitted to a gear 206b formed on the outer circumference of the cam ring 206 via a gear array 208. On the other hand, the first lens frame 201 holding front lens elements 203 is united with the second lens frame 202 holding back lens elements 204. A rectilinear guide rod 210, which is locked in a fixture 213 of a barrel, is fitted in a guide hole 211 bored on the flange of the first lens frame 201 and second lens frame 202. The rectilinear guide rod 210 prevents the rotation of the first lens frame 201 and second lens frame 202 around the optical axis. A spring 212 is compressed and inserted between the first lens frame 201 and the fixture 213, which presses the first lens frame 201 and second lens frame 202 in the optical-axis direction. Thereby, a drive pin 205, which is implanted in the cylindrical outer circumference of the second lens frame 202, is continuously maintained in contact with an end cam 206a formed on the end surface of the cam ring 206 as shown in the development of FIG. 11.

The actuation of the lens drive mechanism having the foregoing construction will be described. First, the drive motor 209 is activated. Then, the cam ring 206 is driven via the gear 206b to rotate with the optical axis as the axis of rotation. The rotation causes, as shown in the development of FIG. 11, the end cam 206a and drive pin 205 to move to positions 206a' and 205' respectively along the optical axis. With the actions of the end cam 206a and spring 212, the first lens frame 201 and second frame lens 202 move in both the α and β directions along the optical axis O.

Thus, when the drive motor 209 starts up, the first lens frame 201 and second lens frame 202 move along the optical axis. The quantities of movements of the first lens frame 201 and second lens frame 202 are controlled with pulses sent from a pulse output unit (not shown) that is interlocked with the cam ring 206 or gear array 208.

The aforesaid conventional lens extension mechanism employs a cam ring, while an extension mechanism shown in FIG. 12 employs a rod type lead screw, a ring type helicoid screw, or other lead screw. In FIG. 12, an output of a drive motor 109 is transmitted as a torque to a lead screw 5 via a gear array 6. Then, driven via a female screw 1a engaging with the lead screw 5, lens frames 1 and 2 whose rotations around the optical axis O are restricted i.e., are not permitted to advance or withdraw along the optical axis. The quantities of movement of the lens frames 1 and 2 are controlled with pulses sent from a photo-interrupter (PI) or other pulse output unit, which is not shown, coupled to the lead screw or gear array.

The aforesaid lens extension mechanism described in Japanese Patent Laid-Open No. 1-158420 rotates a lens having a high moment of inertia to control the extension of a lens. This deteriorates the precision in stopping the lens. A drive motor is requested to provide a high torque, which results in adoption of a large-scale drive motor. Consequently, a lens drive mechanism becomes large.

The aforesaid conventional lens extension unit using a rod type lead screw has solved the foregoing problems of the lens extension unit disclosed in Japanese Patent Laid-Open No. 1-158420. However, since a lead screw is adopted, a lead error caused by the lead screw poses a problem. The lead error is attributable to a difference $\Delta x$ in the quantity of extension relative to the quantity of rotation $\theta$ of the lead screw between a set value TH and an actual value RE caused by a lead screw actually molded or machined.

The above error is, needless to say, present in the aforesaid ring type lead screw.

In recent years, a lens has been more powerful with its size reduced progressively. A minor difference in the quantity of extension influences resolution considerably. From this viewpoint, the aforesaid error becomes a significant problem.

The influence will be described in conjunction with FIG. 13 or the graph of the quantity of extension and FIG. 14 showing how big a circle of confusion caused by a lens is. As shown in FIG. 13, a difference in the quantity of extension relative to the quantity of rotation $\theta$ between a set value and an actual value is $\Delta x$, and the longitudinal magnification of a lens is $\beta 2$. Under these conditions, a product of $\Delta x$ by $\beta 2$ is regarded as a deviation from a focal point of a subject at infinity, fc. Assuming that the diameter of a circle of confusion resulting from the deviation is d, the following equation is established:

$$d = K \cdot \Delta x \cdot \beta 2$$

where, K is a constant of proportion.

If the diameter of a circle of confusion, d, ranges from 30 to 50 μmm, the resultant photograph appears to be in focus. If the diameter is larger than 50 μmm, the resultant photograph looks out of focus. Even when $\Delta x$ is constant, since the longitudinal magnification $\beta 2$ is high due to the recent trend toward reduction of the size of a lens, the diameter of a circle of confusion, d, cannot help but increase.

Therefore, despite the merits of improved precision in stopping a lens and of reduced size of a lens, the lens extension mechanism using a lead screw cannot be employed for a lens that is very powerful or has a high longitudinal magnification $\beta 2$.

OBJECTS AND SUMMARY OF THE INVENTION

A first object of the present invention is to minimize a lens extension error in a moving object extension mechanism.

A second object of the present invention is to enable electrical correction of the extension error.

A lens barrel drive unit for a camera in which the present invention is implemented comprises a lens barrel that is a moving object having a female screw, a drive screw that includes a male screw which engages with the female screw and that moves the lens barrel back and forth with the rotation of the male screw, a drive source for rotating the drive screw, a signal generating means for generating a pulse signal according to the rotation of the drive source or drive screw, a first memory means that stores a difference between a theoretical lead and an actual lead of the drive screw as a correction coefficient, a second memory means that stores the theoretical number of pulses associated with a quantity of rotation of the drive screw which is required to drive the lens barrel to a given position corresponding to a subject distance, and a computing means that uses the correction coefficient and the theoretical number of pulses to compute the actual number of pulses required for extending the lens barrel.

When the foregoing lens barrel drive unit is used to extend a lens barrel, first, the number of extension pulses associated with a required quantity of extension is read from the second memory means. Then, a correction coefficient or a difference between an actual lead and a theoretical lead of the drive screw is read from the first memory means. After the number of extension pulses is corrected using the coefficient, the signal generating means generates pulses by the corrected number of pulses to drive the lens barrel.

In the above controller, a lead error specific to a lead screw is stored as a correction coefficient for a designed value in a memory means, then the coefficient is used to control actual extension. This realizes extension control with a simple construction and high precision.

The other features and advantages of the present invention will be apparent from the description below.

DETAILED DESCRIPTION OF THE PREFERRED EMBODIMENTS

Embodiments of the present invention will be described in conjunction with the drawings.

Figure 1:
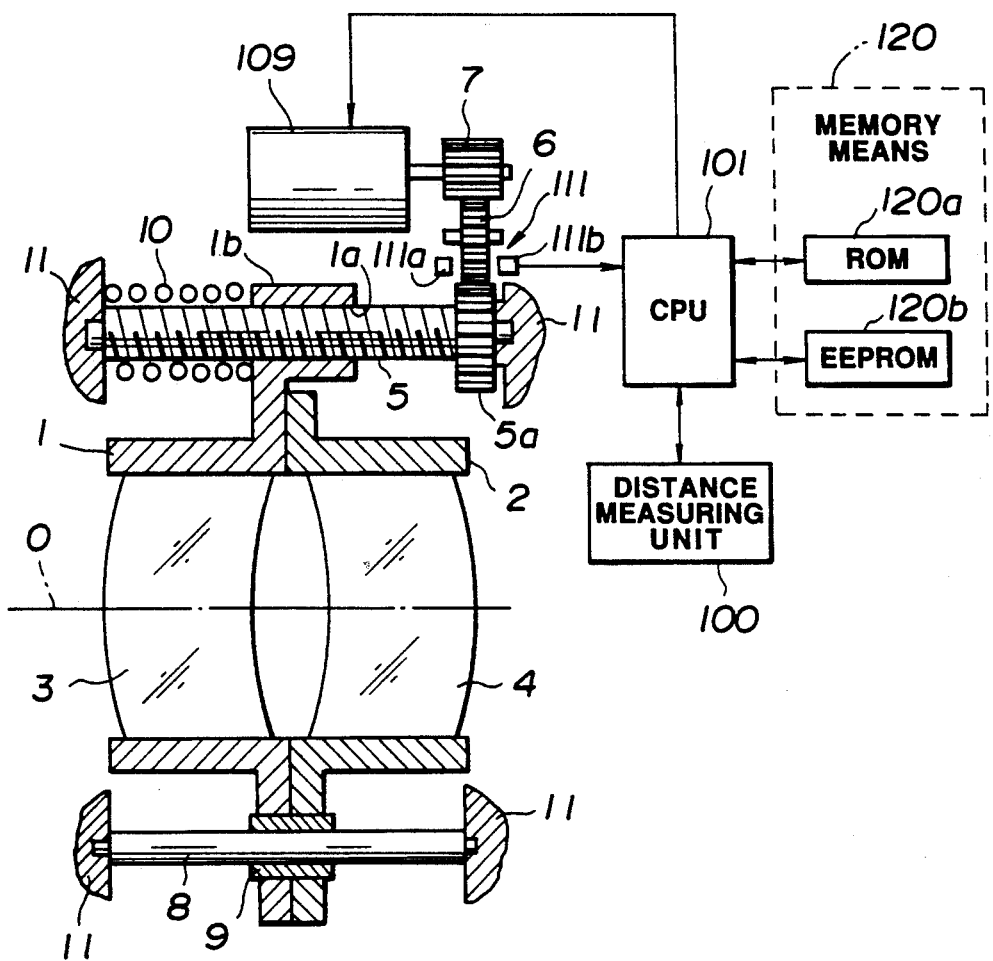
FIG. 1 is a block diagram showing a major portion of a lens extension mechanism for a camera with a built-in lens extension controller of a first embodiment of the present invention.

FIG. 1 is a block diagram showing a major portion of a lens extension mechanism for a camera with a built-in lens extension controller of the first embodiment of the present invention.

As shown in FIG. 1, the extension mechanism includes a lens holding frame 1 made by uniting a first lens frame 1 for holding front lens elements 3 with a second lens frame 2 for holding back (or rear) lens elements 4 using a flange. With the rotation of a rod type lead screw 5 serving as a screw member that threadedly engages with an arm 1b of the flange, the first and second lens frames 1 and 2 advance or withdraw along the optical axis O. The arm 1b of the flange of the first lens frame 1 is threaded to be a female screw 1a that threadedly engages with the lead screw 5. A guide hole 9 is bored in the flange of the first and second lens frames 1 and 2. A rectilinear rod 8 supported by an immovable portion 11 of a barrel is fitted in the guide hole 9. Therefore, the first and second lens frames 1 and 2 will not rotate around the optical axis O but are free advance or withdraw along axis O.

The lead screw 5 is supported by the immovable portion 11 of the barrel. A gear 5a is fixed to one end of the lead screw 5, and engaged with a gear array 6 via an output gear 7 of an AF motor 109 designed for automatic focusing (AF) drive. A compression spring 10 is inserted in a compressed and pressed state between the immovable portion 11 of the barrel and the arm 1b and surrounding a portion of lead screw 5. The compression spring 10 presses the lens holding frame 1 unidirectionally so that a backlash will not occur between the female screw 1a and lead screw 5. In addition, the gear 6 is slitted at regular intervals. A photo-interrupter 111 is made up of a light emitting device 111a and a light receiving device 111b opposed to opposite sides of the slits. The output of the photo-interrupter is fed to a CPU 101. A ROM 120a and an EEPROM 120b which constitute a memory means 120 is connected to the CPU 101. Moreover, a distance measuring unit 100 is connected to the CPU 101.

The actuation of the extension mechanism constructed as mentioned above will be described. First, when the AF motor 109 is activated, the lead screw 5 is driven via the gear array 6 to rotate. When the lead screw 5 rotates, the interactions between the lead screw 5 and female screw 1a, and the guide hole 9 and rectilinear rod 8 cause the first and second lens frames 1 and 2 to advance or withdraw along the optical axis O. At this time, the quantities of extending the first and second lens frames 1 and 2 are controlled according to the number of pulses sent from the light receiving device 111b realized with the photo-interrupter 111.

Distance information provided by the distance measuring unit 100 is fed to the CPU 101. The CPU 101 uses the distance measurement information to retrieve an extension pulse reference value for the lens from a table existent in the ROM 120a serving as the second memory means. The reference value will be described later. Furthermore, a lead error correction coefficient is read from the EEPROM 120b serving as the first memory means. Until the photo-interrupter 111 completes generating pulses by the number of pulses calculated by multiplying the number of extension pulses by the coefficient, the AF motor 109 serving as a lens drive motor is driven to extend the lens. It is, as described previously, very hard to provide a lead screw with a designed lead because of a manufacturing error. Individual lead screws have slight errors. The EEPROM 120b contains a difference between an actual lead and a theoretical lead for each lead screw as a lead error correction coefficient.

Figure 2:
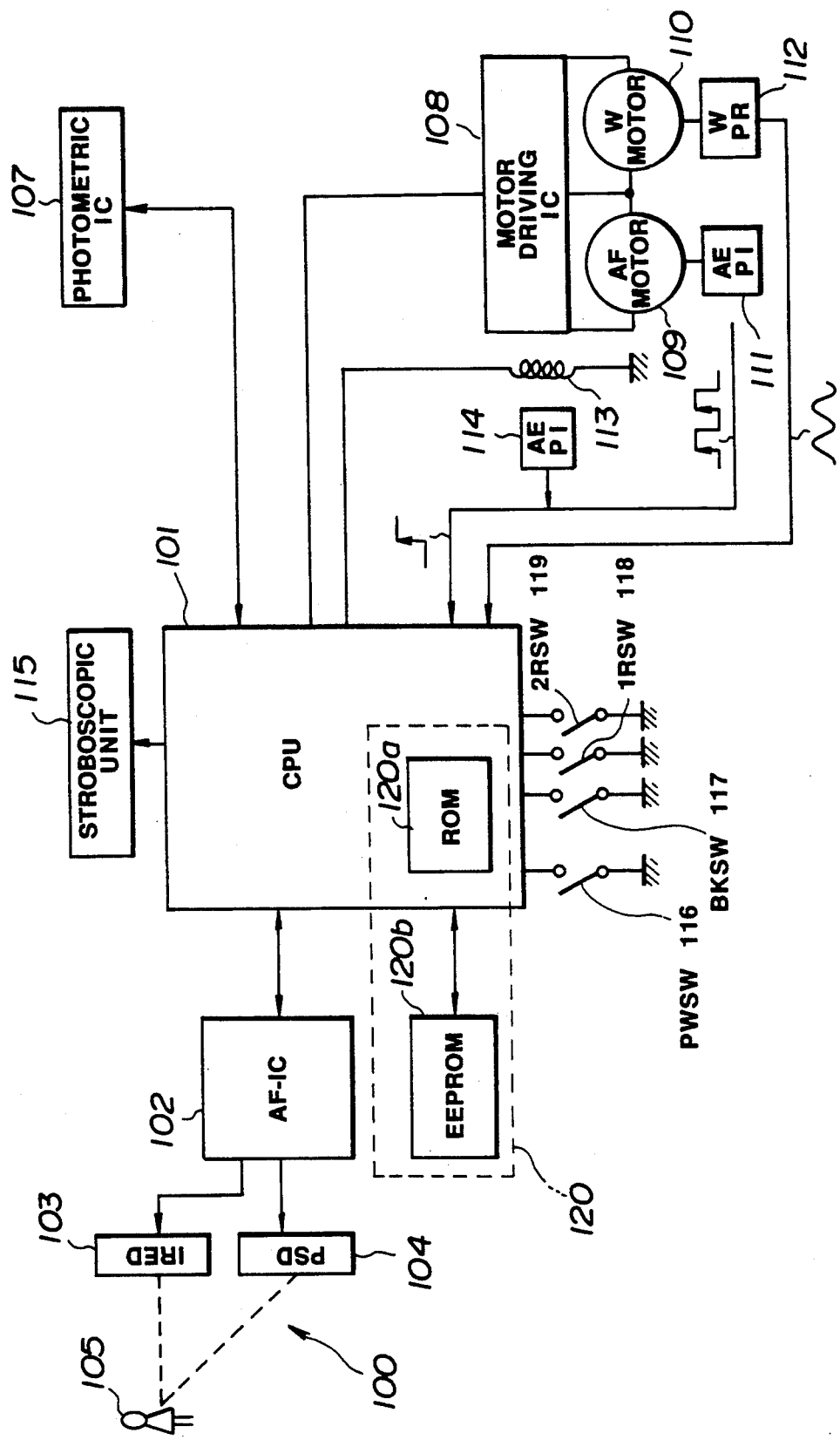
FIG. 2 is a block diagram showing electrical circuitry of the lens extension controller shown in FIG. 1.

Next, an electrical circuitry of the above embodiment will be detailed in conjunction with FIG. 2.

This electrical system has the following components: a CPU 101 that is a microcomputer for controlling the operations of an entire camera and that performs sequence control for a camera, automatic exposure (AE) computation, automatic focusing (AF) computation, and input control for switches; an infrared light-emitting diode (IRED in FIG. 2) 103 for emitting infrared light for distance measurement toward a subject 105; a position sensor 104 for receiving infrared light reflected from the subject 105 and producing a subject position signal; an AF IC 102 that fetches the subject position signal and outputs distance measurement data to the CPU 101; a photometric IC 107 that performs photometry in response to a control signal sent from the CPU 101 and outputs the photometric data to the CPU 101; an AF motor 109 that extends an AF lens made up of front lens elements 3 and back lens elements 4; a W motor 110 for winding film; a motor drive IC 108 that selects either the AF motor 109 for driving a lens or the W motor 110 for winding film in response to a motor drive signal sent from the CPU 101, then drives the selected motor; an AF motor photo-interrupter (AFPI in FIG. 2) 111 that detects the rotation of the AF motor and outputs pulses; a W motor photo-reflector (WPR in FIG. 2) 112 that detects the quantity of winding film and outputs pulses; a shutter open/close solenoid 113 driven with a signal sent from the CPU 101; an AE photo-interrupter (AEPI in FIG. 2) 114 for detecting the actuation of the solenoid 113 or the actuation of the shutter; a stroboscopic unit 115; a power switch (PWSW in FIG. 2) 116 for turning on or off the power supply of the camera; a back switch (BKSW in FIG. 2) 117 for detecting the open or closed state of the back cover; a first-step release switch (1RSW in FIG. 2) 118 for locking AF or AE; a second-step release switch (2RSW in FIG. 2) 119 for exposure; and an EEPROM 120b or a first memory means that constitutes a memory means 120 and serves as a memory member for storing lead error correction coefficients. A ROM 120c or a second memory means that constitutes the memory means 120 and stores pulse reference values is realized with a ROM incorporated in the CPU 101.

Figure 3:
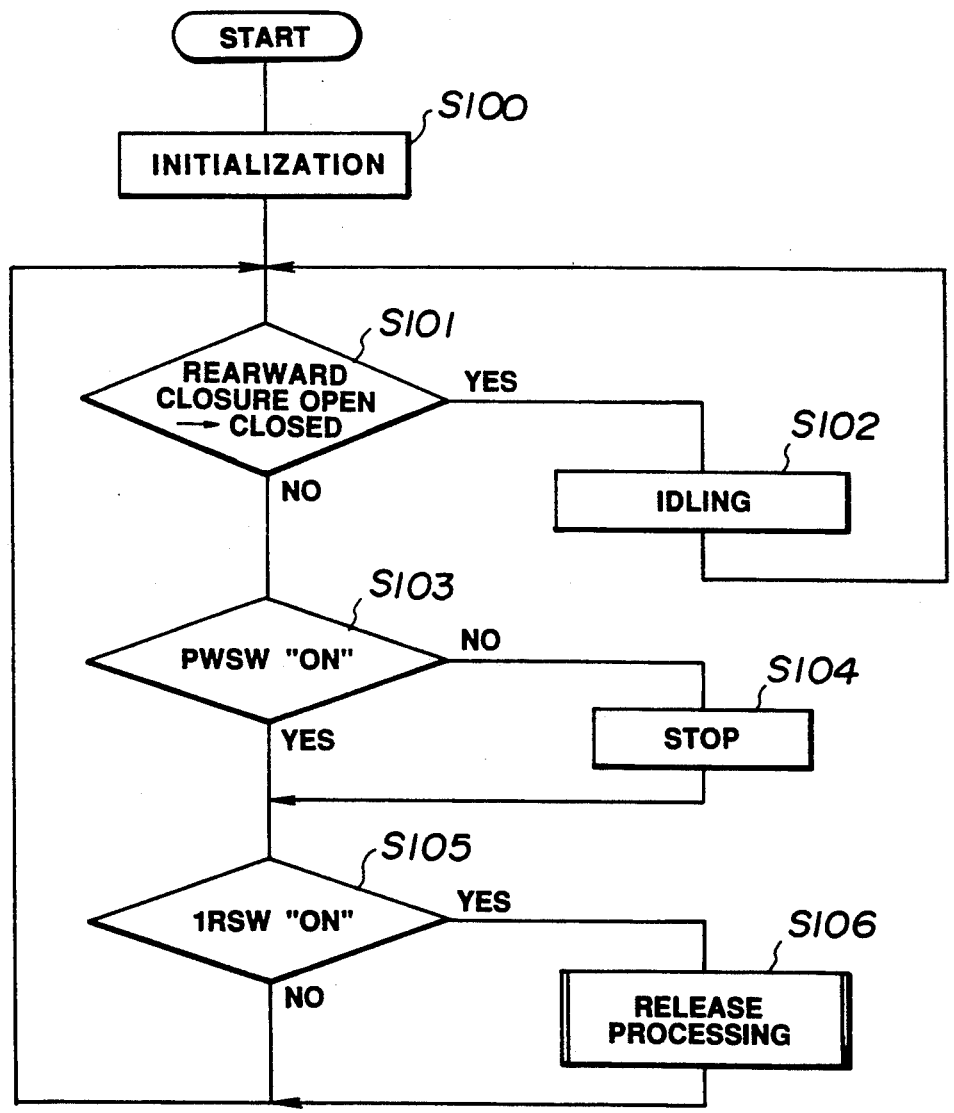
FIG. 3 is a flowchart of a main routine of a photographic sequence for the camera with a built-in lens extension controller shown in FIG. 1.

The photographic sequences of the camera having the foregoing construction will be described in conjunction with the flowchart of a main routine of FIG. 3.

When the power switch 116 is turned on, the CPU 101 is reset. Then, the main routine starts. First, at a step S100, initialization is carried out; that is, the AF IC 102 is reset and the motors 109 and 110 are turned off.

At a step S101, the back switch 117 is checked to see if the back cover is closed. Then, if the back cover, which has been opened, is closed, control passes to a step S102. Then, film idling is performed. After completing film idling, control returns to the step S101. After that, if the back cover remains closed, control passes to a step S103. At the step S103, it is checked if the power switch 116 is on. If the power switch 116 is off, control passes to a step S104. If the power switch 116 is on, control passes to a step S105.

At the step S104, the CPU stops operating, and enters a stop mode or a standby state to hold a low power consumption state. When the power switch 116 or back switch 117 is turned on again to issue an interrupt command, the stop mode is released. Then, control passes to step S105. At the step S105, it is checked if the first-step release switch 118 is on. If the switch 118 is on, control passes to a step S106. If the switch 118 is off, control returns to the step S101. At the step S106, a subroutine Release, which will be described later, is called. After Release terminates, control returns to the step S101.

Figure 4:
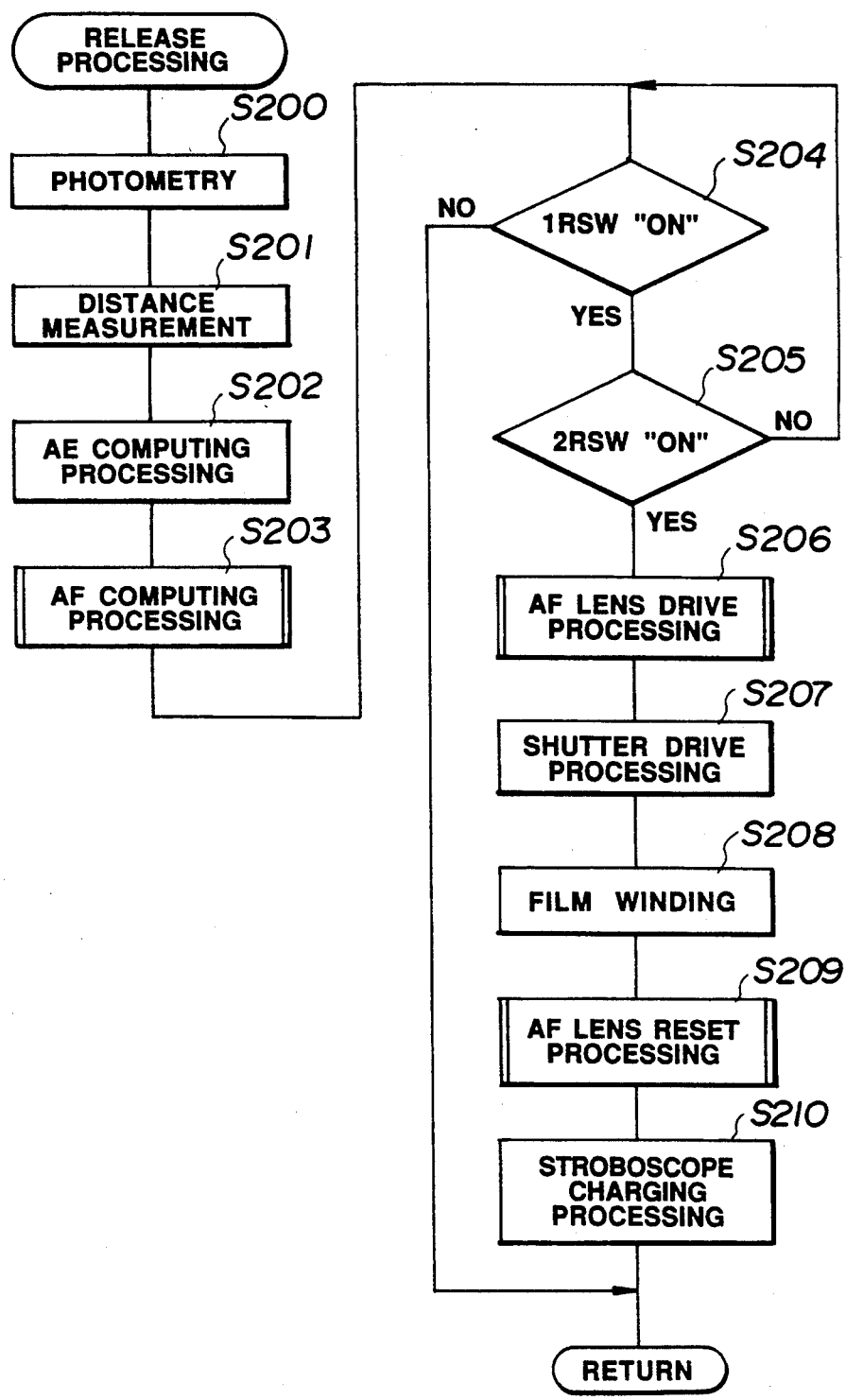
FIG. 4 is a flowchart of a subroutine Release which is called within the main routine shown in FIG. 3.

Next, the subroutine Release will be described in conjunction with the flowchart of FIG. 4.

At a step S200, a control signal is fed to a photometric IC 107. Then, photometry is carried out. The photometric data is fed to the CPU 101. Next, at a step S201, a control signal is fed to the AF IC 102. The distance measurment data is fed to the CPU 101. At a step S202, AE computation is performed using the photometric data fed by the photometric IC 107, and a shutter speed is calculated in units of seconds. At a step S203, a subroutine AF Computation, which will be described later, is called to calculate the number of extension pulses for the AF lens using the distance measurement data.

Then, at a step S204, it is checked if the first-step release switch 118 is on. If the switch 118 is off, control returns from the subroutine to the main routine. If the switch 118 is on, control passes to a step S205. When the first-step release switch 118 is on, the photometric data and distance measurement data are held or locked.

At a step S205, it is checked if the second-step release switch 119 is on. If the switch 119 is off, control returns to the step S204. If the switch 119 is on, control passes to a step S206. Then, a subroutine AF Lens Drive, which will be described later, is called at the step S206. Then, the AF lens is extended according to the number of extension pulses calculated by AF Computation at the step S203.

The solenoid 113 is driven at a step S207. When a sector starts opening, the AE photo-interrupter 114 outputs pulses. With the pulse signal, the CPU 101 carries out exposure at the shutter speed calculated at the step S202. After exposure is completed, film is wound by one frame at a step S208. If the W photo-reflector 112 outputs no pulses within a given period of time, it is determined that all the film has been exposed. Then, the film is rewound. The AF lens has been extended at the step S206. Therefore, at a step S209, the AF lens is reset or returned to the initial position. At a step S210, the stroboscopic unit is charged with electricity in preparation for the next photography operations. Then, control returns to the step S101 of the main routine.

Figure 5:
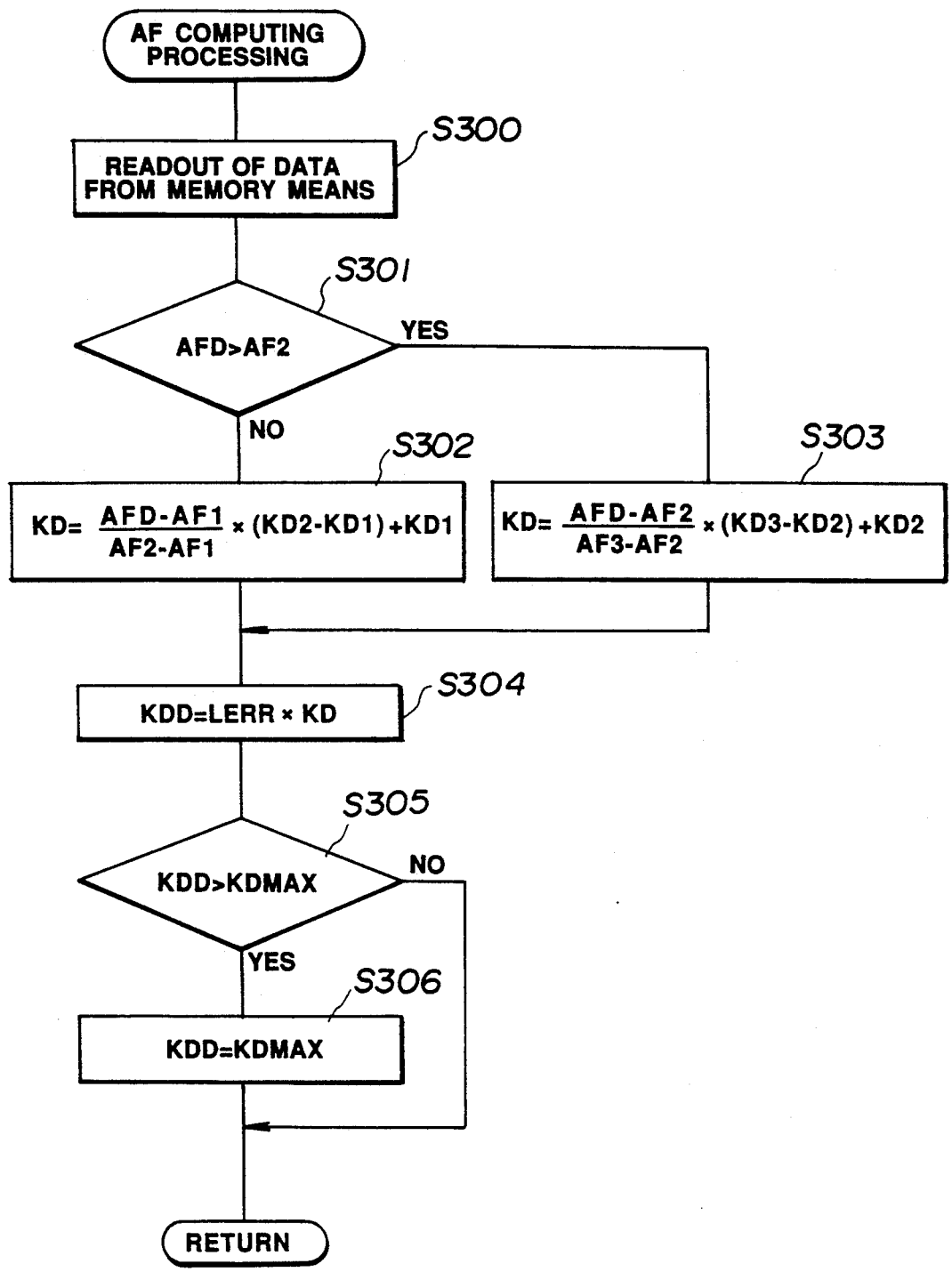
FIG. 5 is a flowchart of a subroutine AF Computation which is called within the subroutine Release shown in FIG. 4.

Next, the subroutine AF Computation called at the step S203 of the subroutine Release will be described in conjunction with FIG. 5.

Figure 6:
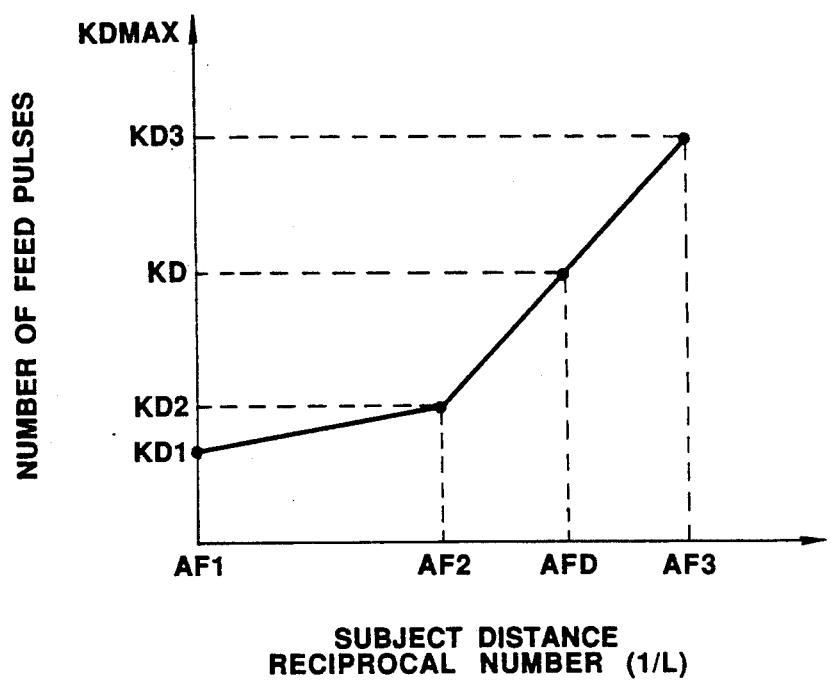
FIG. 6 shows the relationship between a reciprocal of a subject distance and the number of extension pulses in the lens extension controller shown in FIG. 1.

First, at a step S300, pulse reference values and a lead error correction coefficient LERR are read from the memory means 120. FIG. 6 shows the relationship between a reciprocal 1/L (axis of abscissas) of a subject distance L, which is distance measurement data, and the number of extension pulses (axis of ordinates). The pulse reference value represents the number of pulses for an appropriate reference distance; such as, the number of extension pulses KD1 for a distance L of infinity (reciprocal AF1), the number of extension pulses KD2 for an intermediate distance (reciprocal AF2), or the number of extension pulses KD3 for a near distance or a distance relatively close to a subject (reciprocal AF3).

Assuming that distance measurement results in distance measurement data AFD, if AFD is, as shown in FIG. 6, larger than AF2 and smaller than AF3, control passes to a step S303. If the conditions are not met, control passes to a step S302.

At the step S302, the number of extension pulses KD is calculated according to the following equation:

$$KD = \{(AFD - AF1)/(AF2 - AF1)\} \times (KD2 - KD1) + KD1$$

At the step S303, the number of extension pulses KD is calculated according to the following equation:

$$KD = \{(AFD - AF2)/(AF3 - AF2)\} \times (KD3 - KD2) + KD2$$

Next, control passes to a step S304. KD is multiplied by the lead error correction coefficient LERR read from the EEPROM 120. The result of computation or the corrected number of extension pulses which should be provided actually is denoted as KDD.

At a step S305, it is checked if the result of computation or the number of extension pulses, KDD, exceeds a maximum number of extension pulses, KDMAX, which represents a maximum driving capacity of the camera. If KDD exceeds KDMAX, control passes to a step S306. Then, the number of pulses, KDD, is specified as KDMAX. If KDD does not exceed KDMAX, the subroutine terminates. Then, control returns to the Release loop.

In the aforesaid embodiment, a pulse reference value is read for each of three subject distances. Then, the number of pulses for a subject distance falling between two adjacent ones of the three subject distances is calculated by interpolation. If the storage capacity has redundancy, pulse reference values may be determined for subject distances that are set at more minute intervals. This obviates interpolation.

Figure 7:
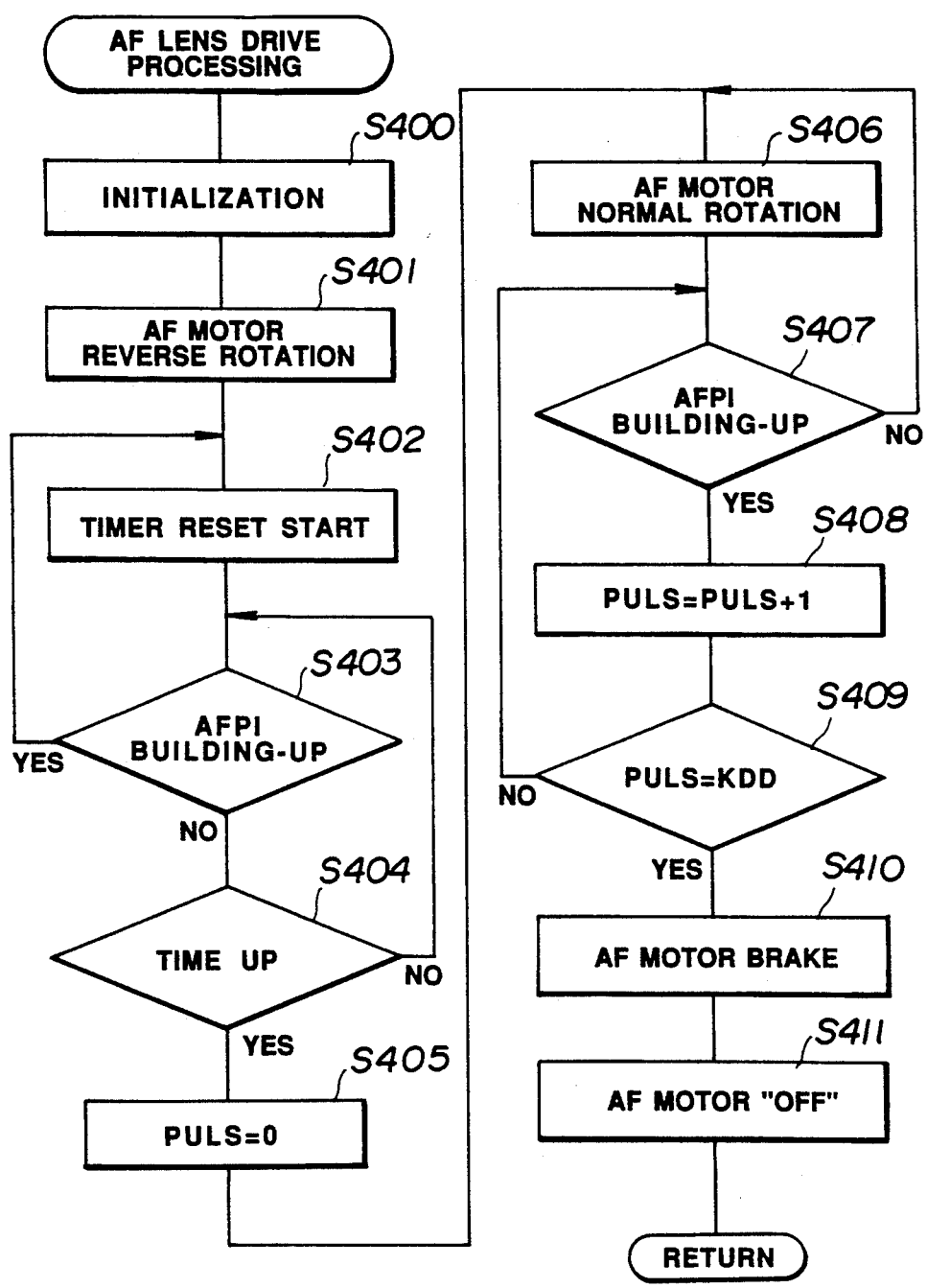
FIG. 7 is a flowchart of a subroutine AF Lens Drive which is called within the subroutine Release shown in FIG. 4.

Next, the subroutine AF Lens Drive, which is called at the step S206 of the Release routine, will be described in conjunction with the flowchart of FIG. 7.

First, at a step S400, a control signal is fed to the motor drive IC 108. Then, initialization is carried out; a motor voltage is set. Next, the AF motor 109 is reversed at a step S401, whereby the AF lens is driven to move to a position at which a mechanical stopper works. At a step S402, a timer for detecting pulses sent from the AF photo-interrupter 111 is reset and started. Then, at a step S403, it is checked if a pulse rise signal representing the rise of a pulse from the AF photo-interrupter 111 is transmitted. If the rise signal is found, control returns to the step S402. Then, the timer is reset and started again. If the rise signal is not found, control passes to a step S404. At the step S404, it is checked if the rise check time is up. If the time is not up, control returns to the step S403. Then, checking the presence of a rise signal concerning the AF photo-interrupter 111 is resumed. If the time is up, it is determined that the AF lens has reached a target position. Then, control passes to a step S405. At the step S405, the count of a photo-interrupter counter, PULS, is reset. Then, at a step S406, the AF motor 109 is rotated to extend the AF lens.

The presence of a rise signal representing the rise of an output of the AF photo-interrupter 111 is checked at a step S407. If the rise signal is absent, control returns to the step S406. If the rise signal is present, control passes to a step S408. At the step S408, the PULS value is incremented. At a step S409, it is checked if the PULS value equals KDD calculated by AF Computation. If the value does not equal KDD, control returns to the step S407. Then, the presence of a rise signal concerning the AF photo-interrupter is checked. On the other hand, if the PULS value equals KDD, it is determined that the AF lens has reached a given position. Then, control passes to a step S410. Then, at the step S410, the AF motor 109 is braked. At a step S411, the AF motor 109 is turned off. After that, control returns to the Release routine.

Figure 8:
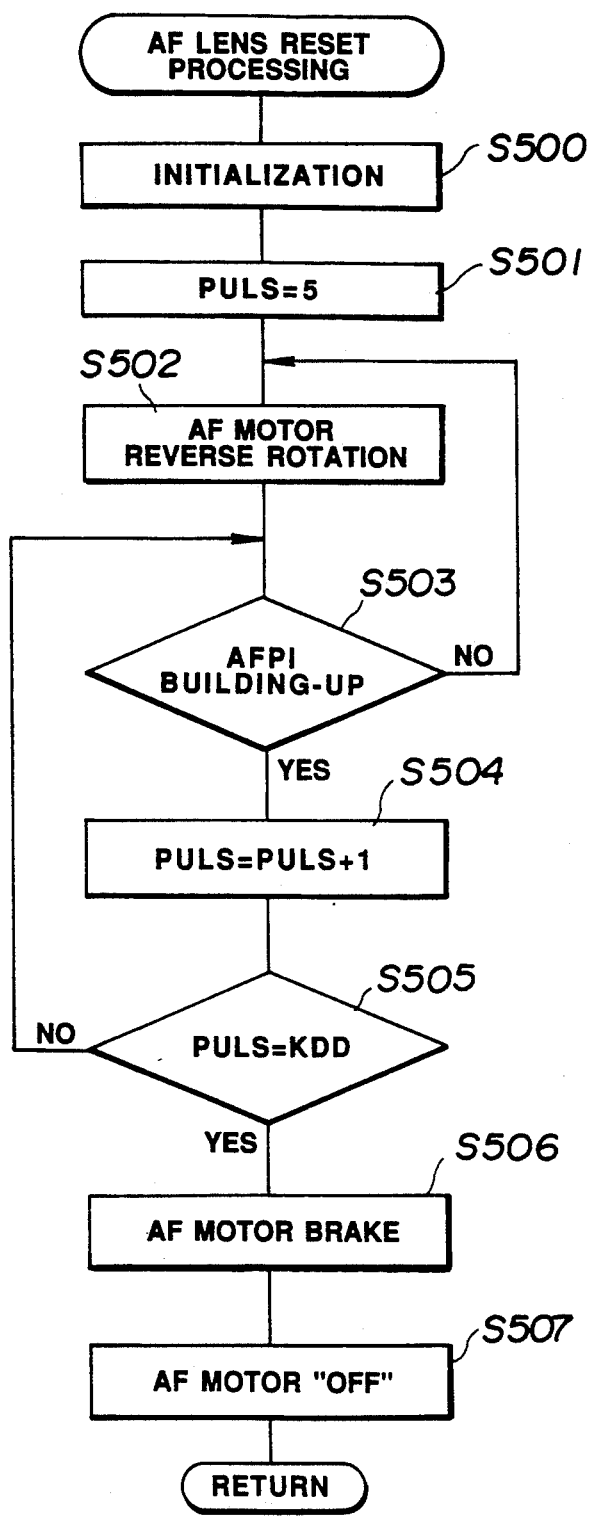
FIG. 8 is a flowchart of a subroutine AF Lens Reset which is called within the subroutine Release shown in FIG. 4.

Next, the subroutine AF Lens Reset, which is called at the step S209 of the Release routine, will be described in conjunction with the flowchart of FIG. 8.

First, at a step S500, a motor drive IC 108 is initialized. Next, the count PULS is set to 5 at a step S501, then the AF motor 109 is reversed at a step S502. Then, it is checked at a step S503 if a rise signal concerning the AF photo-interrupter 111 is transmitted. If the rise signal is not found, control returns to the step S502. If the rise signal is found, control passes to a step S504. At the step S504, the PULS value is incremented. Then, it is checked at a step S505 if the PULS value becomes equal to KDD. If the value is unequal to KDD, control returns to the step S503. When the PULS value becomes equal to KDD, control passes to a step S506. The AF motor 109 is braked at the step S506, then the AF motor is turned off at a step S507. After that, control returns to the Release routine.

This subroutine specifies 5 for PULS at the step S501. When this AF Lens Reset is executed, the AF lens stops at a position that is five pulses nearer than a target position. Therefore, time-consuming alignment of the lens with a target position need not be done at the time of the next extension. This shortens a time lag resulting from release.

As described above, in a lens extension controller of this embodiment, a lead screw 5 of an extension mechanism may cause a lead error. By the way, the error is stored as a lead error correction coefficient LERR in an EEPROM 120b. When lens extension is carried out, the LERR value is read out and used to correct the number of drive pulses. Therefore, according to the present controller, even if a conventional extension mechanism using a lead screw is employed, lens extension can be achieved with high precision. This controller for a camera may be applied to a zoom lens.

Next, a lens extension controller of the second embodiment of the present invention will be described.

Figure 9:
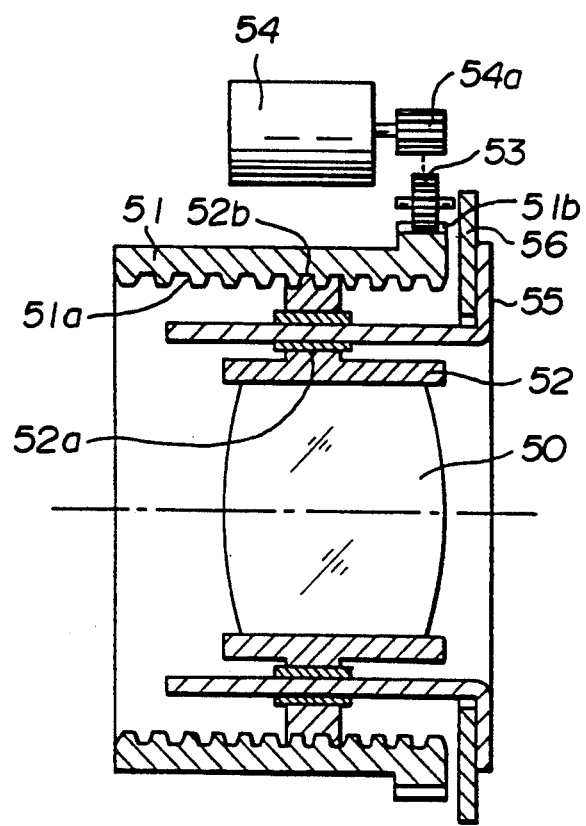
FIG. 9 shows a longitudinal cross section of a major portion of an extension mechanism for a lens extension controller of a second embodiment of the present invention.
Figure 10:
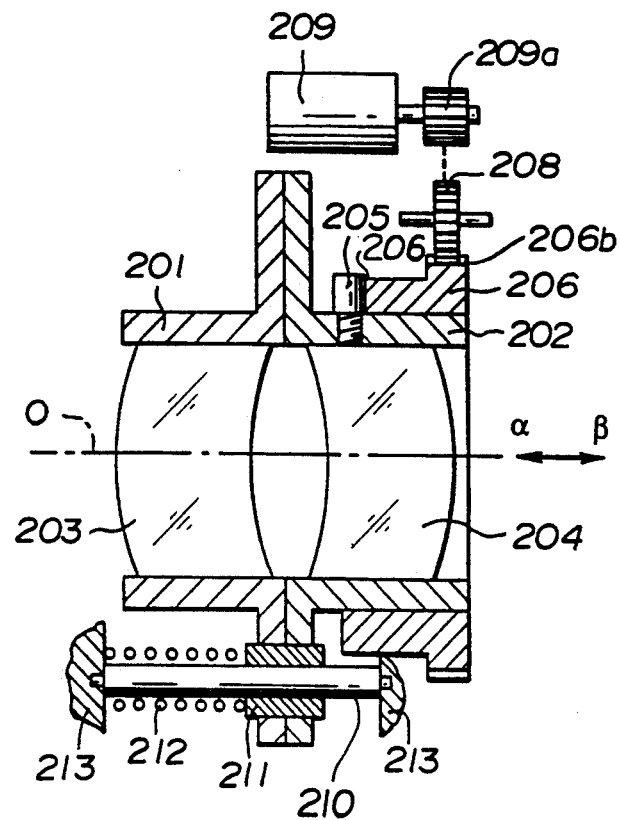
FIG. 10 shows a longitudinal cross section of a major portion of an extension mechanism for a conventional extension controller.
Figure 11:
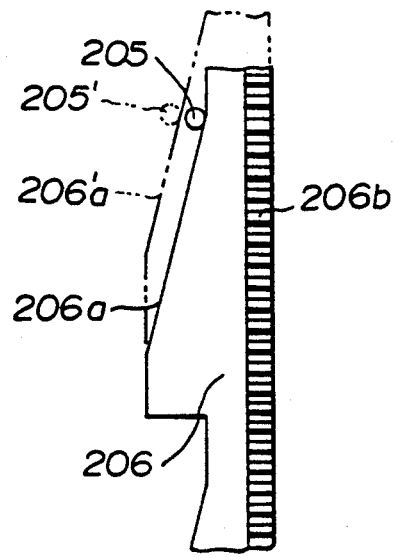
FIG. 11 shows a movement of a cam ring for the lens extension mechanism shown in FIG. 10.
Figure 12:
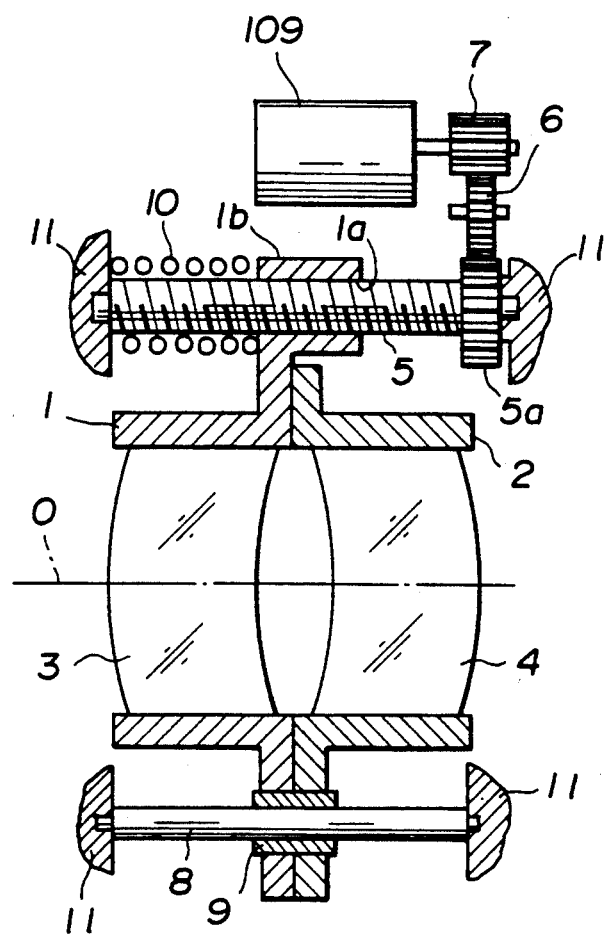
FIG. 12 shows a longitudinal cross section of a major portion of an extension mechanism for another conventional lens extension controller.
Figure 13:
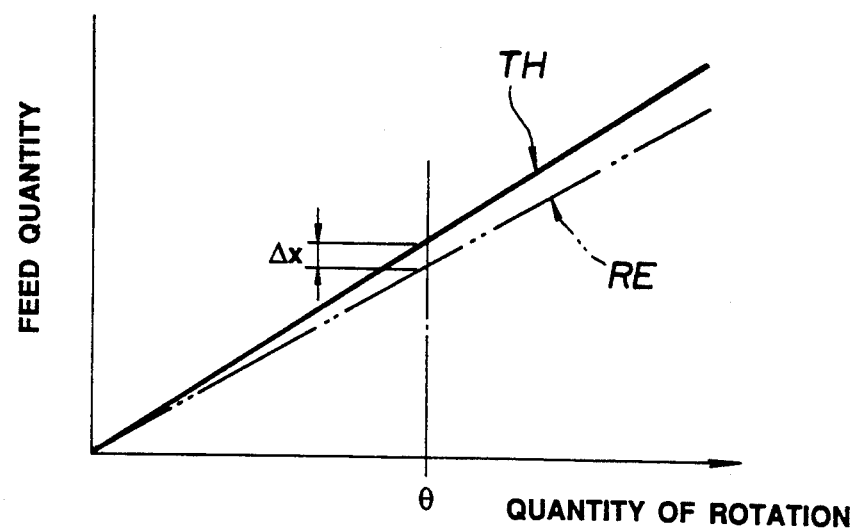
FIG. 13 shows the relationship between the quantity of rotation of a lead screw and the quantity of extension in the extension mechanism using a lead screw for the lens extension controller shown in FIG. 12.
Figure 14:
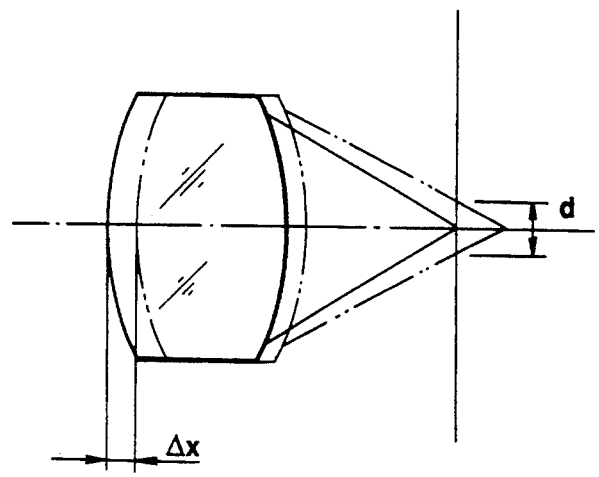
FIG. 14 shows how big a circle of confusion is in terms of an error in the quantity of extension of a lens in the conventional lens extension controller shown in FIG. 12.

FIG. 9 shows a longitudinal cross section of a major portion of a lens extension mechanism for a camera with a built-in lens extension controller of this embodiment. A difference of this embodiment from the first embodiment lies in a drive mechanism for a lens holding frame.

Therefore, the lens extension mechanism alone will be described.

As shown in FIG. 9, a lens holding frame 52 holding lens elements 50 has a guide ditch 52a and a helicoid portion 52b. The helicoid portion 52b is engaged with a male helicoid 51a serving as a ring type lead screw threaded on a helicoid frame 51 that is supported by a barrel to be freely rotatable. A gear 51b is formed on the outer circumference of the helicoid frame 51. The gear 51b is driven by an output gear 54a of a drive motor 54 via a gear array 53. A key member 55 immobilized by an immovable portion of the barrel is fitted in the rectilinear guide ditch 52a. Thus, the lens holding frame 52 is supported so as not to rotate around the optical axis.

The actuation of the lens extension mechanism having the foregoing construction will be described. When the drive motor 54 starts up, the helicoid frame 51 is driven via the gear array 53 to rotate. When the helicoid frame 51 rotates, the interactions between the female helicoid 51a and male helicoid portion 52b, and the rectilinear guide ditch 52a and key member 55 cause the lens holding frame 52 to advance or withdraw straight along the optical axis. In this embodiment, similar to the first embodiment, a lead error of the female helicoid 51a is stored as a lead error correction coefficient LERR in an EEPROM. Then, when lens extension is performed, the LERR value is read out and used to correct the number of drive pulses.

A pulse output unit, which is not shown, coupled to the gear array 53 outputs pulses by the number of pulses equivalent to the quantity of extending the lens holding frame 52. The pulses are used to control the quantity of extending the lens by the same control system as that for the first embodiment.

The present invention can apply to every drive mechanism including those that use a rod type lead screw or a ring type lead screw such as a helicoid screw, as far as a lead error may occur. In the controllers of the embodiments, the present invention is implemented in the lens extension mechanism. Needless to say, the present invention can apply not only to the lens extension mechanism but to any other drive mechanism using a lead screw.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A lens barrel drive unit for a camera, comprising:
   a lens barrel having a female screw;
   a drive screw that includes a male screw which engages with said female screw and that moves said lens barrel back and forth with the rotation of the male screw;
   a drive source for rotating said drive screw;
   a signal generating means that generates a pulse signal responsive to rotation of one of said drive source and drive screw;
   a first memory means that stores a difference between a theoretical lead and an actual lead of said drive screw as a correction coefficient;
   a second memory means that stores the theoretical number of pulses associated with the quantity of rotation of said drive screw which is required to drive said barrel to a given subject distance; and
   a computing means that uses said correction coefficient and said theoretical number of pulses to compute the number of pulses actually required to extend said lens barrel.

2. A lens barrel drive unit for a camera according to claim 1, wherein said first memory means is an EEPROM.

3. A lens barrel drive unit for a camera according to claim 1, wherein said second memory means is a ROM.

4. A lens barrel drive unit for a camera according to claim 1, further comprising a spring member that is placed in an area in which said lens barrel and drive screw engage with each other and that presses said lens barrel unidirectionally.

5. A lens barrel drive unit for a camera according to claim 1, wherein said second memory means stores the theoretical numbers of pulses in association with a plurality of subject distances, and said computing means includes an interpolating means that performs interpolation to calculate the theoretical number of pulses associated with a subject distance falling between two adjacent ones of said plurality of subject distances.

6. A camera having a focus detecting means, comprising:
   a lens barrel having a first screw;
   a driving means that includes a second screw which engages with said first screw and that rotates to move said lens barrel;
   a first memory means that stores a ratio of a theoretical lead to an actual lead of said first screw or second screw as a correction coefficient;
   a second memory means that stores a basic number of pulses representing the quantity of rotation of said driving means which is associated with the output of said focus detecting means; and
   a computing means that uses said correction coefficient and said basic number of pulses to compute the number of pulses actually required to extend said lens barrel.

7. A camera having a focus detecting means according to claim 6, wherein said first screw is a female screw, and said second screw is a rod type lead screw that engages with said first screw.

8. A camera having a focus detecting means according to claim 6, wherein said first screw and said second screw are ring type helicoid screws.

9. A focusing drive unit for a camera, comprising:
   an optical system;
   a screw means that drives said optical system along an optical axis to achieve focusing;
   a driving means for driving said screw means;
   a distance measuring means that detects and outputs a distance to a subject;
   a drive value detecting means that is coupled to said screw means and outputs a value responsive to a drive of the screw means;
   a memory means that stores a coefficient based on a ratio of a theoretical lead to an actual lead of said screw means;
   a drive value generating means that outputs a quantity of driving said optical system according to an output of said distance measuring means on a basis of a theoretical lead of said screw means;
   a computing means that uses the coefficient read from said memory means and the output of said drive value generating means to compute an actual quantity of drive; and a control means that drives said driving means, and that, when the output of said drive value detecting means has a given relationship with a quantity of drive provided by said computing means, stops the drive.

10. A focusing drive unit for a camera according to claim 9, wherein said driving means includes an electric motor.

11. A focusing drive unit for a camera according to claim 9, wherein said drive value detecting means is a pulse generating means.

12. A focusing drive unit for a camera according to claim 9, wherein said screw means includes a bar type helicoid means.

13. A lens drive unit, comprising:
an optical system;
a screw means for driving said optical system along a optical axis;
a driving means for driving said screw means;
a drive value detecting means that is coupled to said screw means and outputs a quantity by which said screw means has been driven;
a memory means that stores a coefficient based on a ratio of a theoretical lead to an actual lead of said screw means;
a drive value generating means that outputs a quantity of driving said optical system on a basis of a theoretical lead of said screw means;
a computing means that uses a coefficient read from said memory means and an output of said drive value generating means to compute an actual quantity of drive; and
a control means that drives said driving means, and that, when the output of said drive value detecting means have a given relationship with a quantity of drive provided by said computing means, stops the drive.

14. A lens drive unit according to claim 13, wherein said optical system is designed for focusing an adjustable taking lens of a camera.

15. A lens drive unit according to claim 13, wherein said optical system is designed for focusing a camera.

16. A lens drive unit according to claim 13, wherein said driving means includes an electric motor.

17. A lens drive unit according to claim 13, wherein said drive value detecting means is a pulse generating means.

18. A lens drive unit, comprising:
a lens holding frame;
a screw mechanism for driving said lens holding frame along a lens axis;
a driving means for driving said screw mechanism;
a drive value detecting means coupled to said screw mechanism;
a computing means that corrects a quantity of driving said lens holding frame by compensating for an error in a quantity of drive occurring in said lens holding frame which is caused by a screw of said screw mechanism having a lead error; and
a control means that compares an output of said drive value detecting means with an output of said computing means, and that, when these outputs have a given relationship with each other, stops said driving means.

19. A lens drive unit according to claim 18, wherein said lens holding frame is an optical system for a camera.

20. A lens drive unit according to claim 18, wherein said lens holding frame is an optical system for focusing an optical system for a camera.

21. A lens drive unit according to claim 18, wherein said driving means includes an electric motor.

22. A lens drive unit according to claim 18, wherein said drive value detecting means is a pulse generating means.

23. A lens extension controller, comprising:
a lens;
a holding frame for holding said lens;
a screw member that is screwed to said holding frame and moves said lens along an optical axis;
a gear array coupled to said screw member;
a motor connected to said gear array;
a drive for driving said motor;
a pulse generator that generates pulses when said lens is moved by said motor driven by said drive;
a memory means that stores a ratio of a theoretical lead to an actual lead of said screw member as a coefficient; and
a means for computing a number of pulses required for extending said lens to a given position on a basis of a theoretical lead of said screw member;
said lens extension controller driving said motor according to said corrected number of pulses and controlling extension of said lens.

24. A lens extension controller according to claim 23, wherein said number of pulses required for extending said lens to a given position is provided by computing a quantity of extending said lens associated with subject distance information and converting the computed quantity into the number of pulses.

25. A lens extension controller according to claim 23, wherein said correction is achieved by multiplying a value computed on a basis of a theoretical lead of said screw member by a coefficient or a ratio read from said memory means.

26. A lens extension controller according to claim 23, wherein said pulse generating means is a non-contact type detector.

27. A lens extension controller according to claim 23, wherein said memory means is an EEPROM.

28. A camera having a focus detecting means, comprising:
a lens barrel;
a driving means that includes a screw which provides a given lead and that rotates by a quantity associated with an output of said focus detecting means to move said lens barrel;
a means that outputs a value corresponding to a manufacturing error in a lead of said screw as a correction coefficient; and
a computing means that uses an output of said focus detecting means and an output of said correction coefficient output means to determine a quantity of drive for said driving means.

29. A lens barrel drive unit for a camera, comprising:
a lens barrel;
a driving means that includes a screw which engages with said lens barrel and that moves said lens barrel with a rotation of the screw;
a means that outputs a value corresponding to a manufacturing error of said screw as a correction coefficient; and
a computing means that uses said correction coefficient to correct a quantity of drive to be made by said driving means.

30. A movement controller, comprising:
a feed screw mechanism;
a moving member that is moved axially by said feed screw mechanism;
an actuator for transmitting power to said feed screw mechanism;
a pulse generator that generates pulses with the movement of said moving member;
a memory means that stores a ratio of theoretical lead to an actual lead of said feed screw mechanism as a coefficient;
a means that computes a number of pulses for moving said moving member on a basis of a theoretical lead of said feed screw; and
a means that uses said computed number of pulses and a coefficient read from said memory means to correct the number of pulses;
said movement controller driving said actuator according to a corrected number of pulses and controlling movement of said moving member.

31. A movement controller according to claim 30, wherein said pulse generating means is a non-contact type detector.

32. A movement controller according to claim 30, wherein said memory means is an EEPROM.

33. A moving member controller, comprising:
a feed screw mechanism;
a moving member that is moved axially by said feed screw mechanism;
an actuator for transmitting power to said feed screw mechanism;
a pulse generator that generates pulses with a movement of said moving member; and
a computing means that provides a corrected number of pulses by counting up said pulses, feeding a drive signal to said actuator until the count indicates the given number of pulses, computing said given number of pulses on the basis of a theoretical lead of said feed screw, and multiplying said given number of pulses by a ratio of a theoretical lead to an actual lead of said feed screw.

34. A moving member controller according to claim 33, wherein said ratio of a theoretical lead to an actual lead of said feed screw is stored in an EEPROM.

35. A lens drive mechanism, comprising:
a lens holding frame;
a rotation drive source;
a driving force transmission means that includes a screw member which causes a quantity of rotation made by said drive source and a quantity of movement made by said lens holding frame to bear a linear relationship and that transmits driving force from said rotation drive source to said lens holding frame;
a memory means that stores designed linearity and actual linearity of said driving force transmission means; and
a control means that controls the quantity of rotation made by said rotation drive source according to an output of said memory means;
said control means approximating actual linearity to designed linearity.

36. A lens drive controller, comprising:
a lens holding frame;
a driving means that drives said lens holding frame;
a first memory means that stores a designed driving characteristic of said driving means;
a second memory means that stores an actual driving characteristic of said driving means; and
a control means that uses an output of said first memory means and an output of said second memory means to control the quantity of drive for said driving means.

37. A lens drive controller, comprising:
a lens holding frame;
a driving means that drives said lens holding frame;
a first memory means that stores data associated with a designed driving characteristic of said driving means;
a second memory means that stores data associated with a manufacturing variation of said driving means; and
a control means that uses an output of said first memory means and an output of said second memory means to control a quantity of drive to be made by said driving means.

38. A method for operating a lens barrel of a camera, said lens barrel having a female screw, a drive screw that includes a male screw which engages with said female screw for moving the lens barrel back and forth with selective rotation of the male screw, said method comprising the steps of:
(a) rotating said drive screw;
(b) generating pulse signals responsive to a predetermined angle of rotation of said drive screw;
(c) computing the amount of drive required to extend the lens barrel to a predetermined position utilizing a value (V1) which represents a distance between a theoretical lead and an actual lead of the drive screw which difference represents a correction coefficient and a value (V2) representing the number of pulses associated with an amount of rotation of the drive screw required to drive the barrel to said predetermined position.

39. The method of claim 38 wherein the values (V1 and V2) are stored in a memory and step (c) further comprises the step of extracting said values from the memory means to perform said computation.

40. The method of claim 39 wherein said memory stores a plurality of theoretical numbers of pulses each associated with a plurality of predetermined lens barrel positions, step (c) further comprising the step of performing interpolation to calculate a theoretical number of pulses associated with the desired lens barrel position, whenever a predetermined lens barrel position lies intermediate two of the stored positions.

41. The method of claim 38 further comprising the steps of:
(d) counting the pulses generated during step (b); and
(e) halting rotating of the lens barrel when the count of pulses obtained in step (d) equals the number of pulses computed at step (c).

42. A method for operating focus detecting means comprising an extendible lens barrel having a first screw, a driving means that includes a second screw which engages with the first screw to move the lens barrel, a first memory means for storing a value (V1) representing a ratio of a theoretical lead to an actual lead to one of said first screw and second screw to serve as a correction coefficient, second memory means storing a value (V2) representing a number of pulses representing a quantity of rotation of said driving means associated with a focused distance, and a pulse generating means for generating a pulse each time one of the first and second screws rotates through a given angle, said method comprising the steps of:

(a) determining a distance of a subject from the camera;

(b) utilizing the values (V1) and (V2) retrieved from said memories to compute the number of pulses actually required to extend the lens barrel;

(c) counting the pulses generated by the pulse generating means; and (d) halting the lens barrel when the number of pulses computed during step (b) equals the number of pulses counted at step (c).

43. A method for adjusting a camera optical system having a screw means that drives the optical system along an optical axis to achieve focusing, a driving means for driving the screw means and pulse generating means for generating a pulse each time the screw means rotates through a given angle, said method comprising the steps of:

(a) determining the distance between said camera and a subject being photographed;

(b) computing an actual quantity of drive for operating said driving means utilizing a value (V1) representing a coefficient which represents a ratio of a theoretical lead to an actual lead of the screw means and a drive value (V2) which represents a quantity of driving the optical system to the in-focus position as a function of the theoretical lead of the screw means;

(c) operating the drive means according to the value computed at step (b);

(d) counting the number of pulses generated by said pulse generating means; and (e) halting the drive means when the count obtained in step (d) has a predetermined relationship with the quantity computed during step (b).

44. A method for moving a movable member comprised of a feed screw mechanism, which movable member is moved axially by said feed screw mechanism, an actuator for transmitting power to the feed screw mechanism, and a pulse generator for generating pulses responsive to a given increment of movement of the moving member, said method comprising the steps of:

(a) applying drive to the actuator;

(b) calculating a predetermined number of pulses needed for moving said moving member to a predetermined position on the basis of a value (V1) representing a theoretical lead of said feed screw;

(c) multiplying the given number of pulses by a value (V2) representing a ratio of a theoretical lead to an actual lead of the feed screw;

(d) counting the number of pulses outputted by said pulse generator; and (e) halting drive to said actuator when the number of pulses counted in step (d) is equal to the number of pulses determined during step (c).

45. The method of claim 44 wherein values (V1) and (V2) are stored in a memory and steps (b) and (c) further respectively include retrieving values (V1) and (V2) from the memory.

* * * * *

UNITED STATES PATENT AND TRADEMARK OFFICE
CERTIFICATE OF CORRECTION

PATENT NO. : 5,319,498
DATED : June 7, 1994
INVENTOR(S) : Minoru Hara, Kazuhiro Satoh It is certified that error appears in the above-indentified patent and that said Letters Patent is hereby corrected as shown below:

Column 1, line 32, after "axis" insert --$\beta$--.
Column 3, line 45, change "Release" to --"Release"-- (quotes omitted).
Column 3, lines 47-48, change "AF Computation" to --"AF Computation" (quotes omitted).
Column 3, line 48, change "Release" to --"Release"-- (quotes omitted).
Column 3, line 53, change "AF Lens Drive" to --"AF Lens Drive"-- (quotes omitted).
Column 3, line 54, change "Release" to --"Release"-- (quotes omitted).
Column 3, line 56, change "AF Lens Reset" to --"AF Lens Reset"-- (quotes omitted).
Column 5, line 60, change "120c" to --120a--.

Signed and Sealed this

Twenty-fifth Day of April, 1995

Attest:

BRUCE LEHMAN

Attesting Officer

Commissioner of Patents and Trademarks